US012235496B2

United States Patent
Marciante

(10) Patent No.: US 12,235,496 B2
(45) Date of Patent: Feb. 25, 2025

(54) METHOD AND SYSTEM FOR STABILIZING FIBER GRATING OPTICAL PARAMETERS

(71) Applicant: RAM Photonics Industrial, LLC, Webster, NY (US)

(72) Inventor: John R. Marciante, Webster, NY (US)

(73) Assignee: RAM Photonics Industrial, LLC, Webster, NY (US)

(*) Notice: Subject to any disclaimer, the term of this patent is extended or adjusted under 35 U.S.C. 154(b) by 0 days.

(21) Appl. No.: 18/614,520

(22) Filed: Mar. 22, 2024

(65) Prior Publication Data

US 2024/0231019 A1 Jul. 11, 2024

Related U.S. Application Data

(62) Division of application No. 17/582,293, filed on Jan. 24, 2022, now Pat. No. 11,960,130.

(60) Provisional application No. 63/140,709, filed on Jan. 22, 2021.

(51) Int. Cl.
*G02B 6/42* (2006.01)
*F21V 8/00* (2006.01)

(52) U.S. Cl.
CPC ......... *G02B 6/4243* (2013.01); *G02B 6/4266* (2013.01); *G02B 6/0026* (2013.01)

(58) Field of Classification Search
CPC ... G02B 6/4243; G02B 6/4266; G02B 6/0026
See application file for complete search history.

(56) References Cited

U.S. PATENT DOCUMENTS

| 4,791,644 A | 12/1988 | Dube |
| 7,199,924 B1 | 4/2007 | Brown et al. |
| 9,293,889 B1 | 3/2016 | Henry et al. |
| 10,365,167 B2 | 7/2019 | Hockaday |
| 11,960,130 B2 * | 4/2024 | Marciante ............ G02B 6/4243 |
| 2004/0208580 A1 | 10/2004 | Zhao |

(Continued)

FOREIGN PATENT DOCUMENTS

| CN | 106785843 A | 5/2017 |
| CN | 109038192 A | 12/2018 |

(Continued)

OTHER PUBLICATIONS

U.S. Appl. No. 17/582,293, "Non-Final Office Action", Sep. 8, 2023, 9 pages.

(Continued)

*Primary Examiner* — Tina M Wong
(74) *Attorney, Agent, or Firm* — KILPATRICK TOWNSEND & STOCKTON LLP

(57) ABSTRACT

A method of stabilizing a fiber Bragg grating (FBG) disposed in a thermomechanical housing included performing an initialization process including measuring a transmission ratio at a plurality of FBG temperatures between an initial and final temperature, determining a maximum transmission ratio, and changing the temperature of the FBG until the transmission ratio equals a target transmission ratio. The method also includes performing an operation process including (a) measuring the transmission ratio, (b) adjusting the FBG temperature to align the measured transmission ratio with the predetermined fraction of the maximum transmission ratio, and (c) iteratively performing (a) and (b).

19 Claims, 9 Drawing Sheets

(56) References Cited

U.S. PATENT DOCUMENTS

| | | |
|---|---|---|
| 2006/0285813 A1 | 12/2006 | Ferguson |
| 2007/0092182 A1* | 4/2007 | Kobayashi ......... G02B 6/02209 385/37 |
| 2007/0211772 A1 | 9/2007 | Romano et al. |
| 2008/0198880 A1 | 8/2008 | Munroe et al. |
| 2009/0046746 A1 | 2/2009 | Munroe et al. |
| 2009/0169150 A1 | 7/2009 | Xia |
| 2011/0038635 A1 | 2/2011 | Bai |
| 2011/0128655 A1 | 6/2011 | Hochlehnert et al. |
| 2011/0249979 A1 | 10/2011 | Sheng et al. |
| 2014/0023098 A1 | 1/2014 | Clarkson et al. |
| 2018/0100978 A1 | 4/2018 | Kim et al. |
| 2019/0341739 A1 | 11/2019 | Loh et al. |
| 2021/0313758 A1 | 10/2021 | Rockwell |
| 2022/0236501 A1 | 7/2022 | Marciante |
| 2022/0239054 A1 | 7/2022 | Marciante |

FOREIGN PATENT DOCUMENTS

| | | |
|---|---|---|
| EP | 1241746 A1 | 9/2002 |
| JP | 2008197301 A | 8/2008 |
| WO | 2008064874 A1 | 6/2008 |
| WO | 2016069744 A1 | 5/2016 |
| WO | 2018001442 A1 | 1/2018 |
| WO | 2018044500 A1 | 3/2018 |

OTHER PUBLICATIONS

PCT/US2022/013465, "International Preliminary Report on Patentability", Aug. 3, 2023, 14 pages.

PCT/US2022/013465, "International Search Report and Written Opinion", Jun. 16, 2022, 17 pages.

PCT/US2022/013465, "Invitation to Pay Additional Fees and, Where Applicable, Protest Fee", Mar. 31, 2022, 2 pages.

PCT/US2022/013466, "International Preliminary Report on Patentability", Aug. 3, 2023, 16 pages.

PCT/US2022/013466, "International Search Report and Written Opinion", Jun. 14, 2022, 20 pages.

PCT/US2022/013466, "Invitation to Pay Additional Fees and, Where Applicable, Protest Fee", Mar. 31, 2022, 2 pages.

U.S. Appl. No. 17/582,312, "Non-Final Office Action", Sep. 19, 2024, 20 pages.

U.S. Appl. No. 17/582,293, "Notice of Allowance", Dec. 22, 2023, 8 pages.

U.S. Appl. No. 18/614,520, "Notice of Allowance", Oct. 23, 2024, 9 pages.

EP22743310.9, "Extended European Search Report", Nov. 8, 2024, 12 pages.

EP22743311.7, "Extended European Search Report", Dec. 5, 2024, 9 pages.

Limpert et al., "The Rising Power of Fiber Lasers and Amplifiers", Institute of Electrical and Electronics Engineers Journal of Selected Topics in Quantum Electronics, vol. 13, No. 3, May-Jun. 2007, pp. 537-545.

Supradeepa, "Stimulated Brillouin Scattering Thresholds in Optical Fibers for Lasers Linewidth Broadened with Noise", Optics Express, vol. 21, No. 4, Feb. 25, 2013, pp. 4677-4687.

\* cited by examiner

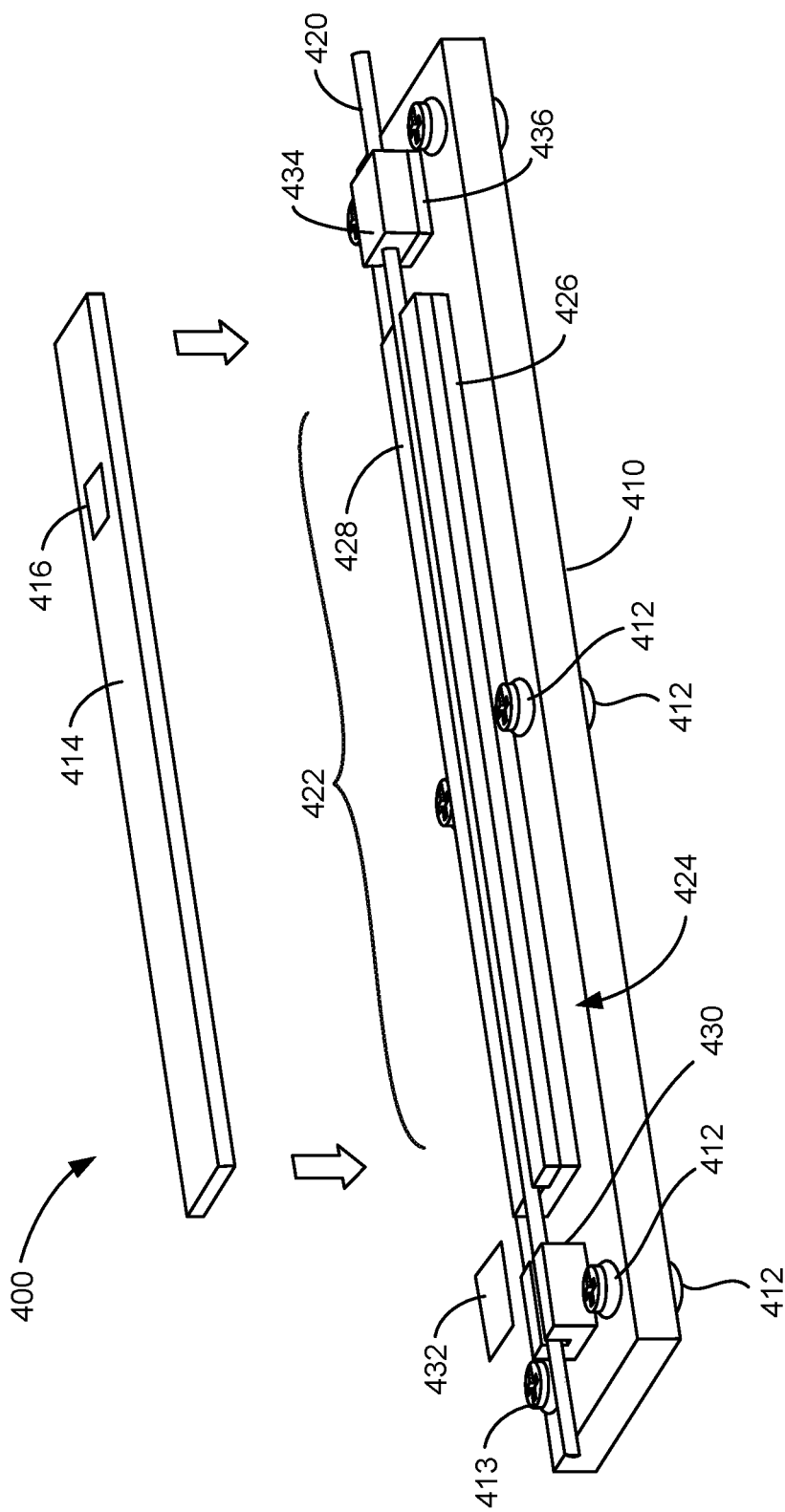

METHOD AND SYSTEM FOR STABILIZING FIBER GRATING OPTICAL PARAMETERS

CROSS-REFERENCE TO RELATED APPLICATIONS

This application is a divisional of U.S. patent application Ser. No. 17/582,293, filed, Jan. 24, 2022, which claims the benefit of U.S. Provisional Application No. 63/140,709, filed Jan. 22, 2021, the contents of which are hereby incorporated by reference in their entirety for all purposes. U.S. patent application Ser. No. 17/582,312, filed Jan. 24, 2022, entitled "METHOD AND SYSTEM FOR MULTI-WAVELENGTH LASER SYSTEM," is also incorporated by reference in its entirety for all purposes:

BACKGROUND OF THE INVENTION

Fiber Bragg gratings (FBGs) are characterized by a reflection or transmission bandwidth, for example, on the order of 10-300 GHz, and a central frequency, for example, on the order of 283,000 GHz. Although FBGs can be designed to provide the desired reflection or transmission, a number of detrimental effects are encountered when operating in realistic environments and under high optical intensities.

Despite the progress made in the development of FBGs, there is a need in the art for improved methods and systems related to stabilizing and controlling FBGs.

SUMMARY OF THE INVENTION

The present disclosure relates generally to methods and systems related to FBGs that operate at specific frequencies. More particularly, embodiments of the present invention provide methods and systems that allow FBGs to reflect or transmit at specific frequencies in realistic operating environments. In a particular embodiment, the FBGs are controlled using a thermo-mechanical housing that minimizes the impact of optical nonlinearities and temperature, stress, and vibrations from the surrounding environment.

According to an embodiment of the present invention, a system for stabilizing optical parameters of a fiber Bragg grating (FBG) is provided. The system includes a mechanical mount, a heating element coupled to the mechanical mount, and a base plate coupled to the heating element. The base plate comprises a longitudinal groove. The system also includes a fiber anchor coupled to the mechanical mount and a fiber including the FBG mechanically attached to the fiber anchor. The FBG of the fiber is disposed in the longitudinal groove.

According to another embodiment of the present invention, a method of stabilizing an FBG disposed in a thermo-mechanical housing is provided. The method includes performing an initialization process including setting a temperature of the FBG to an initial value, changing the temperature of the FBG to a final value, and measuring a transmission ratio at a plurality of FBG temperatures between the initial value and the final value. The initialization process also includes determining a maximum transmission ratio, setting the temperature of the FBG to the initial value, and iteratively, changing the temperature of the FBG and measuring the transmission ratio until the transmission ratio equals a predetermined fraction of the maximum transmission ratio. The method also includes performing an operation process including (a) measuring the transmission ratio, (b) adjusting the FBG temperature to reduce the measured transmission ratio and the predetermined fraction of the maximum transmission ratio, and (c) iteratively performing (a) and (b).

According to a specific embodiment of the present invention, a system for stabilizing optical parameters of a fiber Bragg grating (FBG) section of an optical fiber is provided. The system includes a mechanical mount, a heating element coupled to the mechanical mount, and a base plate coupled to the heating element. The base plate comprises a longitudinal groove and the FBG section of the optical fiber is disposed in the longitudinal groove. The system also includes a first fiber guide coupled to the mechanical mount. The first fiber guide comprises a first longitudinal channel and a first portion of the optical fiber is disposed in the first longitudinal channel. The system further includes a second fiber guide coupled to the mechanical mount. The second fiber guide comprises a second longitudinal channel and a second portion of the optical fiber is disposed in the second longitudinal channel.

According to another specific embodiment of the present invention, an optical system is provided. The optical system includes a mechanical mount, a heating element coupled to the mechanical mount, and a base plate coupled to the heating element. The base plate comprises a longitudinal groove. The optical system also includes a fiber including a fiber Bragg grating (FBG) disposed in the longitudinal groove. The FBG of the fiber is disposed in the longitudinal groove. The optical system further includes a first attachment element mechanically coupled to a first end of the fiber and a second attachment element mechanically coupled to a second end of the fiber.

Numerous benefits are achieved by way of the present disclosure over conventional techniques. For example, embodiments of the present disclosure, the fiber Bragg grating (FBG) is located in close proximity to a thermo-electric cooler, allowing accurate temperature control of the FBG. Moreover, the effects of stress and vibration are reduced by securing the FBG at only one location on the fiber.

Furthermore, embodiments of the present invention include a novel architecture including a single region of rigid contact between elements of the thermo-mechanical housing and the fiber, vibration isolation between the housing and the fiber, and a thermal control section adjacent to and thermally coupled to the FBG that enables the implementation of a feedback control system using optical input and output power measurements. These and other embodiments of the disclosure, along with many of its advantages and features, are described in more detail in conjunction with the text below and corresponding figures.

BRIEF DESCRIPTION OF THE DRAWINGS

Aspects of the present disclosure now will be described more fully hereinafter with reference to the accompanying drawings, which are intended to be read in conjunction with both this summary, the detailed description and any preferred and/or particular embodiments specifically discussed or otherwise disclosed. The various aspects may, however, be embodied in many different forms and should not be construed as limited to the embodiments as set forth herein; rather, these embodiments are provided by way of illustration only and so that this disclosure will be thorough, complete and will fully convey the full scope to those skilled in the art.

FIG. 4A is a simplified schematic diagram illustrating a thermo-mechanical housing according to an embodiment of the present invention.

DETAILED DESCRIPTION OF SPECIFIC EMBODIMENTS

The present disclosure relates generally to methods and systems related to FBGs that are stabilized at an optical frequency. More particularly, embodiments of the present invention provide methods and systems provide control and stabilization of the reflection and transmission spectra of FBGs. In a particular embodiment, the reflection and transmission spectra of FBGs is stabilized against environmental perturbations, for example due to temperature, stress, or vibrations. The disclosure is applicable to a variety of applications in telecommunications, signal processing, lasers and optics, including fiber laser implementations.

Figure 1A:
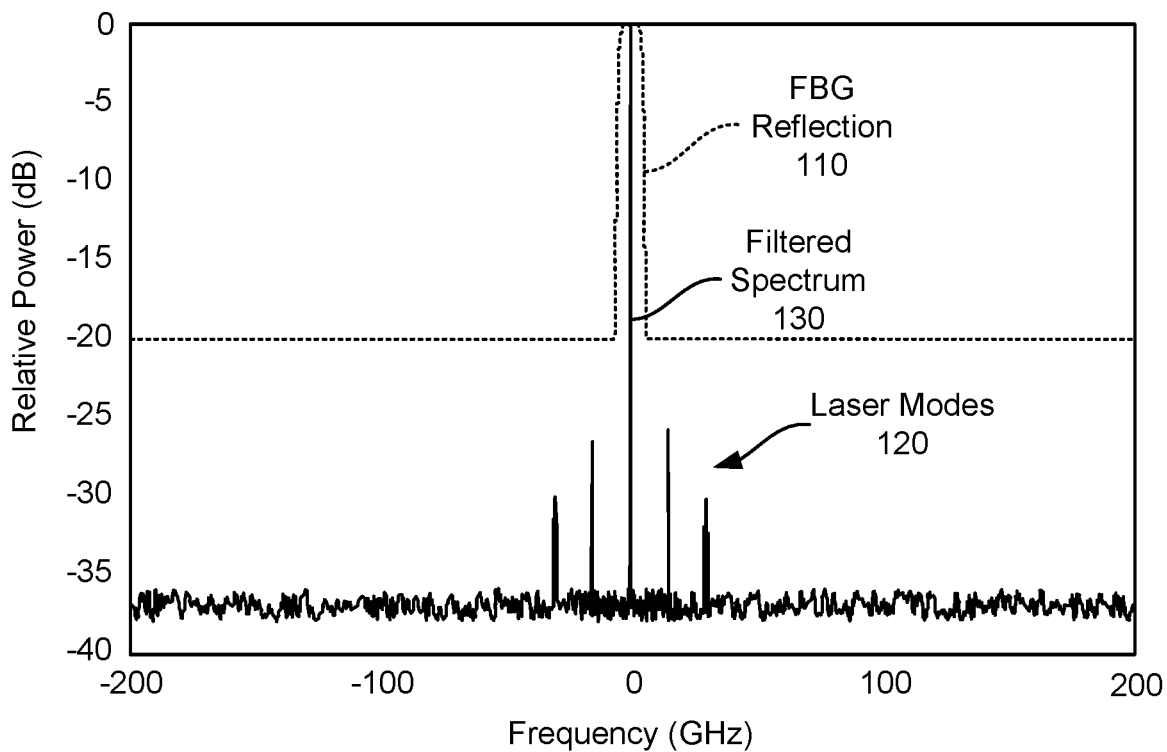
FIG. 1A is a plot illustrating the spectra of diode laser emission and FBG reflection according to an embodiment of the present invention.

FIG. 1A is a plot illustrating a typical output spectrum of a diode laser and an FBG spectral response. The diode laser has a desired signal peak and an undesirable noise floor that includes multiple longitudinal modes 120 of the laser cavity that are not completely suppressed. In this example, the laser has a longitudinal mode spacing of 15 GHz and a noise floor that is −38 dB below the signal peak. The FBG spectrum 110 illustrated in FIG. 1A is shown for an "ideal" case in which it is assumed that no manufacturing errors are present, no temperature variations or stress is experienced, and the optical intensity is sufficiently low to avoid nonlinear optical effects. In this example, the FBG has a central frequency that is centered on the desired peak of the diode laser and has a bandwidth of 10 GHz.

Figure 1B:
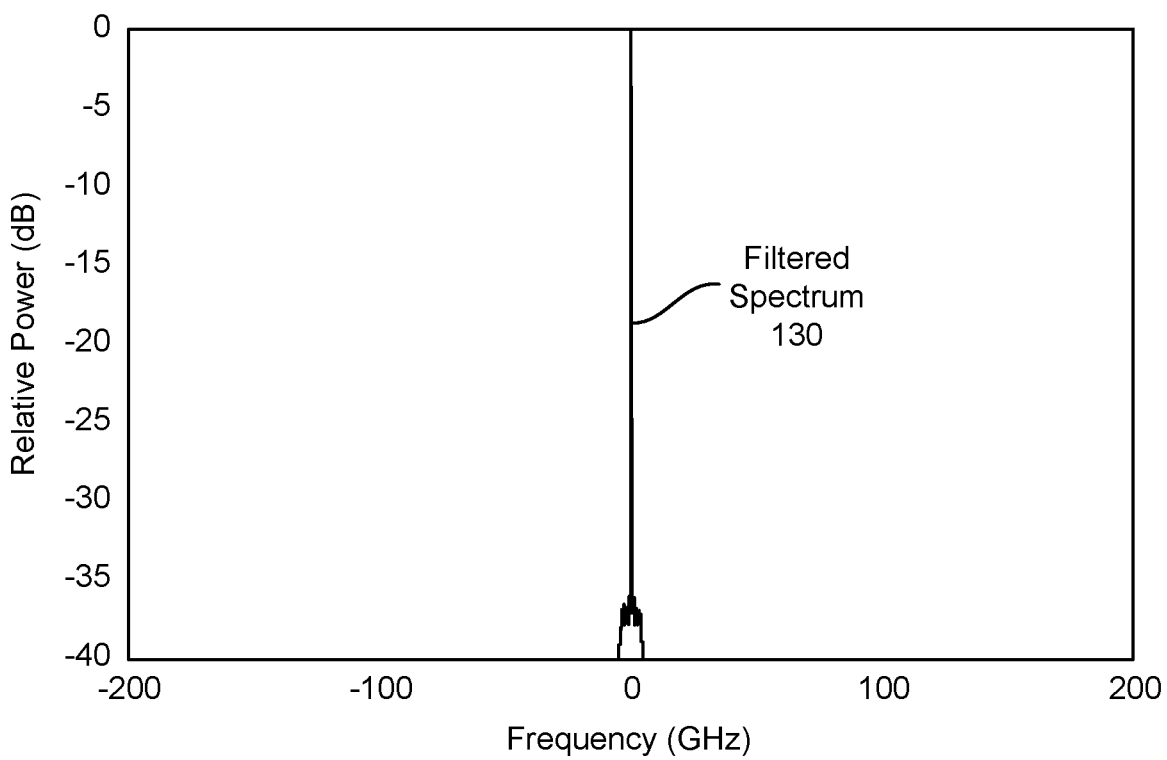
FIG. 1B is a plot illustrating the output of the diode laser after being filtered by the FBG according to an embodiment of the present invention.

The diode laser light can be directed through the FBG to reduce the noise floor and undesirable longitudinal modes. Mathematically, this is represented by a multiplication of the two spectra. FIG. 1B shows the resultant filtered optical spectrum 130, which has eliminated the multiple longitudinal modes and reduced the noise floor over all frequencies except a narrow band around the central peak. This function is desirable in many applications including telecommunications and signal processing.

Figure 2A:
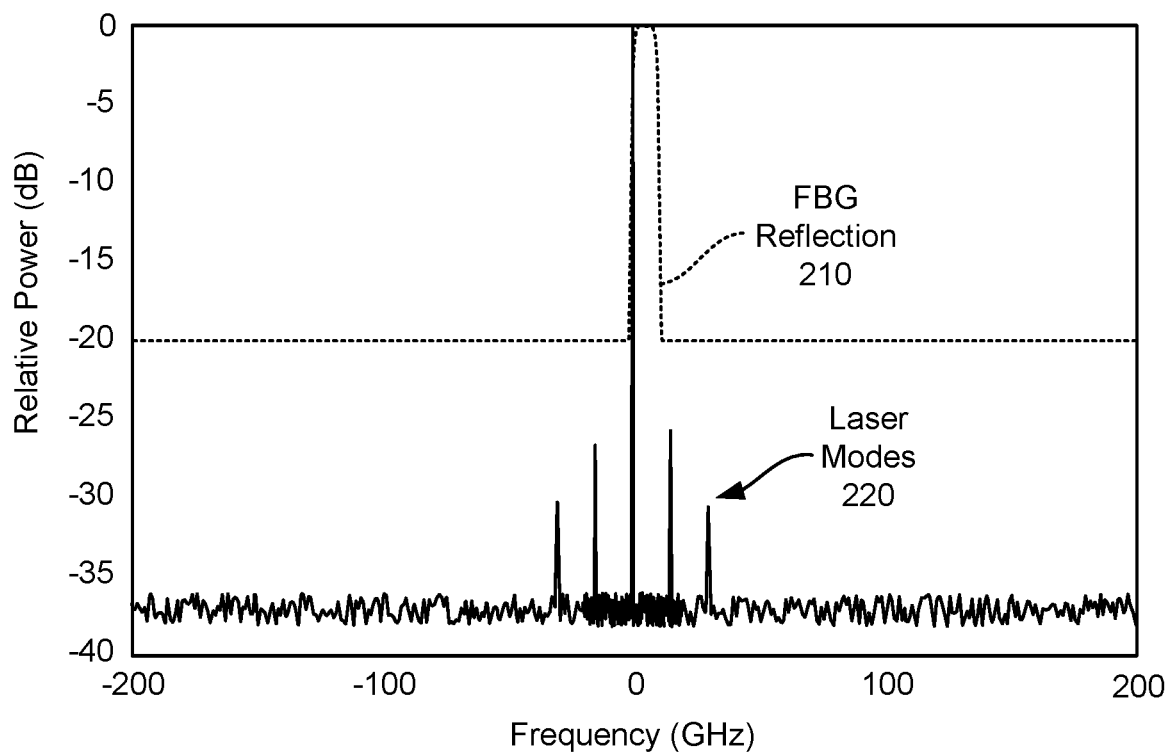
FIG. 2A is a plot illustrating the spectra of diode laser emission and FBG reflection with fabrication errors according to an embodiment of the present invention.
Figure 2B:
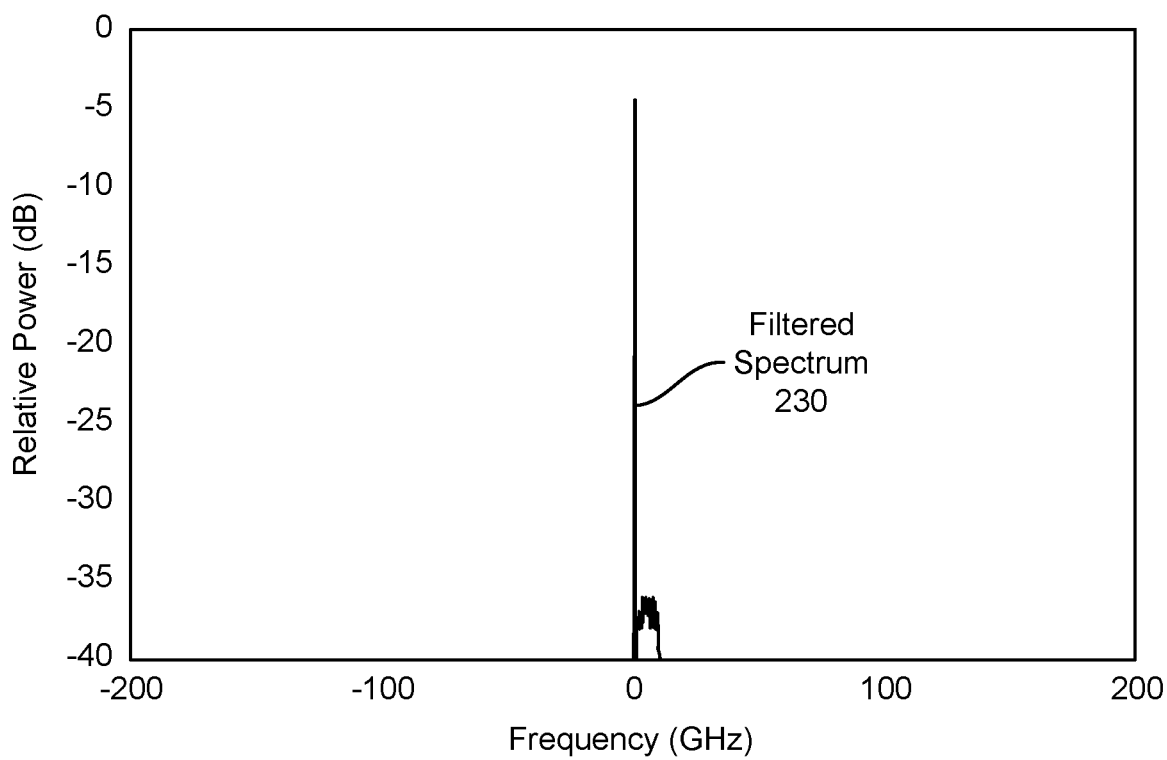
FIG. 2B is a plot illustrating the output of the diode laser after being filtered by the FBG according to an embodiment of the present invention.

FIG. 2A is a plot illustrating the output spectrum 220 of a diode laser and an FBG spectral response 210 with fabrication errors. When typical fabrication errors of +0.02 nm in the periodicity of the FBG used, the reflection spectrum for the FBG and the central peak of the diode laser spectrum are shifted in central frequency related to one another, resulting in reduced spectral overlap. This leads to a significant 75% loss of optical power in the resultant filtered optical spectrum 230 as shown in FIG. 2B. Thus, small variations in manufacturing tolerances can impact the effectiveness of the filtering operation.

Figure 3A:
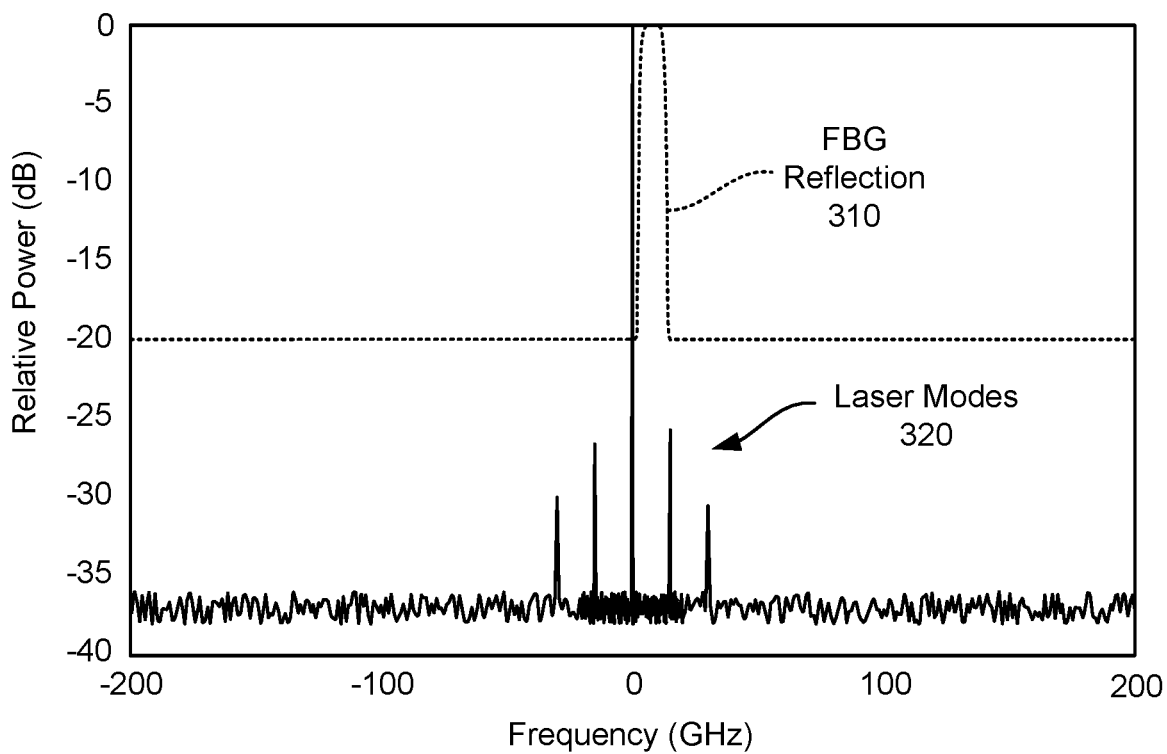
FIG. 3A is a plot illustrating the spectra of diode laser emission and FBG reflection with temperature variation according to an embodiment of the present invention.
Figure 3B:
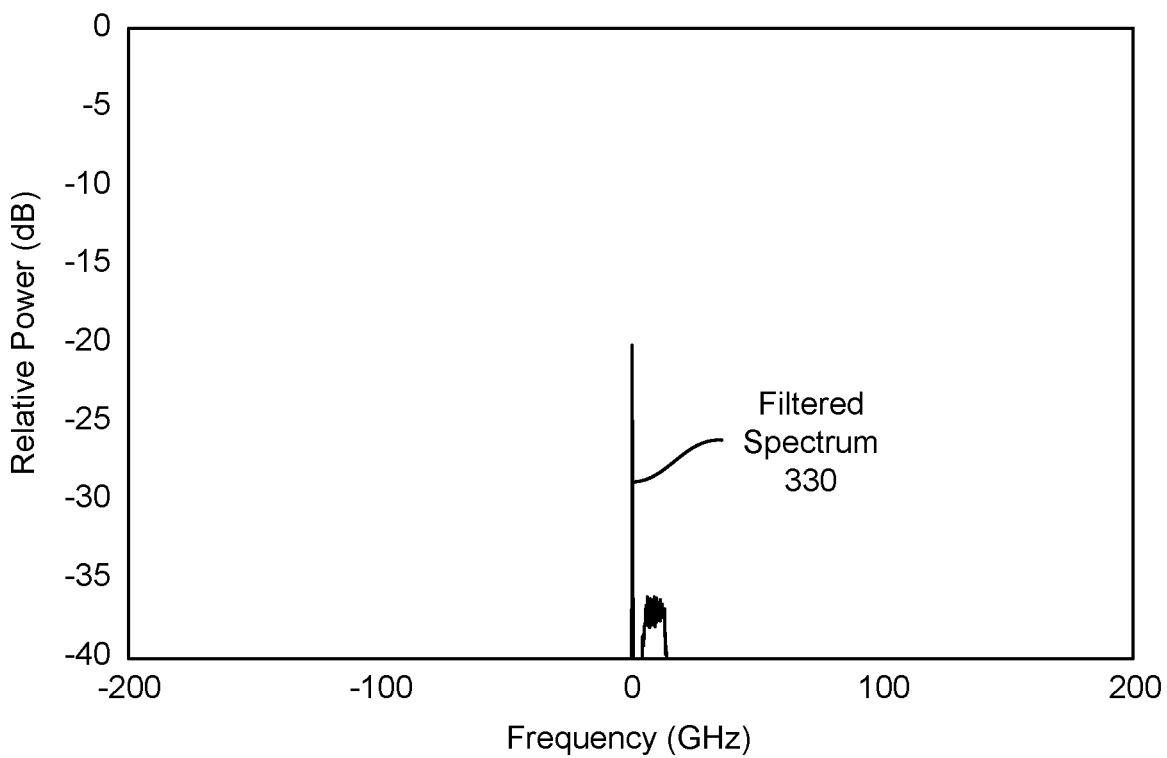
FIG. 3B is a plot illustrating the output of the diode laser after being filtered by the FBG according to an embodiment of the present invention.

FIG. 3A is a plot illustrating the output spectrum 320 of a diode laser and an FBG spectral response 310 with temperature variation. When the temperature of the FBG used as the filter is varied, for example, by 3° C. as illustrated in FIG. 3A, the reflection spectrum for the FBG central peak of the diode laser spectrum are shifted in central frequency relative to one another, resulting in reduced spectral overlap. This leads to a significant 99% loss of optical power in the resultant filtered optical spectrum 330 as shown in FIG. 3B. Thus, in addition to variations in manufacturing tolerances, modification of the operating temperature of the oscillator can impact the lasing bandwidth. The inventors have determined that environmental temperatures may change by +/−5° C. during normal operation.

Accordingly, embodiments of the present invention utilize precise control over the temperature and physical properties of the FBG to enable the laser oscillator, despite the narrow spectral bandwidth, for example, on the order of 10 GHz, to retain a desired central frequency.

Although FIGS. 1A-3B illustrate a system in which an FBG functions as a spectral filter on the optical output of a diode laser, embodiments of the present invention are not limited to this implementation. In other embodiments, for example, the FBGs are used as cavity mirrors in fiber lasers.

FIG. 4A is a simplified schematic diagram illustrating a thermo-mechanical housing 400 according to an embodiment of the present invention. The illustrated thermo-mechanical housing can be utilized as a thermo-mechanical housing utilized in a laser and provides a precision, temperature-controlled platform for control and operation of a fiber Bragg grating. It should be noted that although thermo-mechanical housing 400 can be utilized in conjunction with signal processing, the thermo-mechanical housing is not limited to these applications and can be utilized in other optical applications. As an example, narrow-band fiber gratings deployed in thermo-mechanical housing 400 can be utilized in intra-cavity or extra-cavity filtering in low-noise laser systems. The use of the thermo-mechanical housing enables fiber gratings with high quality factors, for example, Q>2,000,000 (i.e., bandwidth <100 MHz) to be implemented, representing an order of magnitude higher quality factor than passive laser cavities typically found in semiconductor lasers. Moreover, when integrated into an optical communication system, high-Q, high-reflectivity, and low-loss fiber gratings deployed in a thermo-mechanical housing can enable suppression of laser noise in the mid-high offset frequency band (offset frequency >100 MHZ), where the excess noise in this band significantly affects the signal to noise ratio of communication channels and the sensitivity of optical sensing systems due to compromise between additive noise and phase noise filtering.

As illustrated in FIG. 4A, embodiments of the present invention provide a mechanical design for a thermo-mechanical housing for the fiber grating that provides mechanical support for the fiber while reducing or minimizing the transfer of mechanical perturbations in the environment to the fiber and specifically, to the grating section of the fiber. A novel architecture including a single region of rigid contact between elements of the thermo-mechanical housing and the fiber, vibration isolation between the housing and the fiber, and a thermal control section adjacent to and thermally coupled to the FBG enables the implementation of a feedback control system using optical input and output power measurements useful for laser architectures is provided by embodiments of the present invention.

Referring to FIG. 4A, thermo-mechanical housing 400 includes mechanical mount 410, which can be fabricated using materials with high rigidity. As an example, mechanical mount 410 can be fabricated from invar or other suitable materials and can have dimensions on the order of 20 mm in length, 10 mm in width, and 10 mm in thickness. A plurality of vias passing through mechanical mount 410 are used to enable shock absorbing members 412 to pass through mechanical mount 410. Shock absorbing members 412 can be fabricated from elastic materials with high elasticity, including silicone, rubber, and the like.

Although not illustrated in FIG. 4A for purposes of clarity, mechanical mount 410 is joined to a housing (not shown) using fasteners 413, which are illustrated as Phillips head screws in this embodiment. Shock absorbing members 412 are mounted between mechanical mount 410 and the housing (not shown) and fasteners 413 in order to isolate mechanical mount 410 from the housing (not shown). In other embodiments, other mounting techniques are utilized to mechanically isolate mechanical mount 410 from surrounding structures. Although shock absorbing members 412 are illustrated as ring-shaped elastic O-rings, this is not required by the present invention and other implementations, including an elastic gasket having a shape corresponding to that of mechanical mount 410 can be positioned between mechanical mount 410 and the housing (not shown) in order to reduce vibration of fiber 420, particularly grating section 422, which can be referred to as the FBG, for example, at acoustic frequencies. Thus, thermo-mechanical housing 400, including the housing (not shown), can be utilized as a thermo-mechanical housing for a laser. One of ordinary skill in the art would recognize many variations, modifications, and alternatives.

In order to support grating section 422 of fiber 420, fiber suspension unit 424 includes heating element 426 mounted on mechanical mount 410 and base plate 428 mounted on heating element 426. In some embodiments, heating element 426 includes a thermoelectric material that can be heated or cooled in response to current flow. In other embodiments, a resistive element is included in heating element 426 to enable the temperature of the heating element to be increased and decreased in response to current flow. Although thermoelectric and resistive elements are described herein, embodiments of the present invention are not limited to these particular implementations of a heating element and other devices can be used to provide thermal control for heating element 426.

In embodiments in which heating element 426 is implemented as a thermoelectric element, it can have a thickness on the order of ~2-3 mm can be mounted directly to mechanical mount 410 or positioned between a shock absorbing pad (now shown) and base plate 428. In this embodiment, base plate 428 can be positioned on the cold side and mechanical mount 410 can be positioned on the hot side of the thermoelectric element. A membrane heater can also be used, for example, with a thermal insulator (e.g., a Teflon plate) positioned between the membrane heater and mechanical mount 410 to reduce heat flow to mechanical mount 410. Thus, in this embodiment, the membrane heater in combination with the thermal insulator can result in a combined thickness >5 mm. As will be evident to one of skill in the art, the response time associated with thermal control roughly scales with (total thermal capacity of the holder)/(maximum thermal output power of thermal element−heat loss to external elements), so reductions in size of the various elements and better thermal insulation around the elements will increase responsivity.

The combination of mechanic mount 410 being supported by shock absorbing members 412, fiber guide 430 and fibers suspension unit 424 suspending fiber 420 in a low friction and high thermal conductivity material, and fiber anchor 434 mounted to mechanical mount 410 using shock absorbent pad 436 enables the isolation of fiber 420 from both external vibrations and mechanical stress via the damped suspension of fiber 420, particularly grating section 422, by these elements utilizing the thermal grease.

Base plate 428 is mounted to heating element 426 and is thermally coupled to heating element 426 in order to inject or extract thermal energy into our out of grating section 422 of fiber 420. Base plate 428 includes a groove running along the length of the base plate. The groove can be referred to as a longitudinal groove. In the illustrated embodiment, the groove is laterally centered on base plate 428 and has a depth approximately equal to the thickness of base plate 428. Grating section 422 of fiber 420 is suspended in a thermal compound (not shown). The thermal compound, for example, silicone or graphite-infused paste, provides a high level of thermal conductivity between grating section 422 of fiber 420, base plate 428, and heating element 426. A variety of thermal compounds, also referred to as thermal grease, can be utilized to provide low friction, high thermal conductivity support for grating section 422 of fiber 420. Thus, thermally-induced stress that would arise in grating section 422 of fiber 420 if the temperature of grating section 422 varied without an accompanying variation in length can be reduced or prevented.

In some embodiments, grating section 422 of fiber 420, as well as other sections of fiber 420, can be encased in a low friction sheath, for example, a graphite wrap, that surrounds and contacts the periphery of the fiber, thereby allowing for motion of the fiber longitudinally with respect to the low friction sheath. Such a graphite-wrapped fiber surface will be characterized by reduced friction with respect to the side walls of the groove of base plate 428. In addition to a reduction in friction, enabling the fiber to translate longitudinally, the low friction sheath can be characterized by high thermal conductivity, improving the thermal uniformity of the fiber and the thermal compound along grating section 422. In embodiments using a graphite wrap, since graphite sheets possess high thermal conductivity ($>>100$ W/(m−K)) parallel to the surface of the graphite sheet, i.e., along the longitudinal axis of the fiber, the temperature of the fiber, particularly, the grating section, can be maintained at a uniform temperature, thereby preventing pass-band broadening. As will be evident to one of skill in the art, if the grating section were characterized by a non-uniform temperature as a function of length, the grating section will be chirped as either the index of refraction and/or the grating spacing will vary with length. This chirp will result in broadening of the pass-band as the different sections of the fiber at different temperatures are characterized by different reflectivity profiles. In addition to graphite wraps, other approaches to increase longitudinal heat transfer, including embedding heat transfer filaments in the thermal compound, are included within the scope of the present invention and are applicable as appropriate. Thus, utilizing embodiments of the present invention, thermal control via heating element 426 and a thermal sensor 416, for example, a thermistor, embedded in cover plate 414, which are elements of fiber suspension unit 424, enables control of the center frequency of the FBG and uniform temperature as a function of length of the FBG reduces pass-band broadening.

Fiber guide 430 supports fiber 420, but allows fiber 420 to translate longitudinally in response to temperature variation and thermal expansion or contraction of the fiber in the longitudinal direction. As discussed in relation to base plate 428, fiber guide 430 includes a groove running along the length of the fiber guide and fiber 420 is suspended in a lubricant compound (not shown) filling the groove. In some embodiments, to distinguish from the groove present in base plate 428, the groove in fiber guide 430 is referred to as a longitudinal channel. The lubricant compound, for example, silicone or graphite-infused paste, in conjunction with the groove in fiber guide 430 enables fiber 420 to be supported while still enabling translation along the longitudinal direction. In some implementations, the portion of fiber 420 supported by fiber guide 430 is encased in a low friction sheath as discussed above. Thus, as the temperature of the fiber varies, mechanically-induced stress that would arise if fiber 420 were not able to expand or contract in length, can be reduced or prevented. As illustrated in FIG. 4A, a cap 432 is attached, for example, bonded, bolted, attached with a screw attachment, or otherwise affixed, to fiber guide 430 to enclose the corresponding portion of fiber 420 and the lubricant compound in the groove in fiber guide 430. Accordingly, fiber 420 is supported in the lateral directions while enabling a degree of longitudinal motion resulting from thermal changes.

Fiber anchor 434 is positioned at the end of mechanical mount 410 opposite fiber guide 430, and supports fiber 420. Fiber 420 is anchored at a substantially fixed longitudinal position using fiber anchor 434. As an example, fiber suspension unit 424 can be fabricated using a plastic/metal cube that is divided in half and has a v-groove engraved onto the top surface of the bottom half. The two halves are then bonded together after fiber 420 has been positioned between them. In the illustrated embodiment, fiber anchor 434, which can be fabricated using a rigid material such as metal or a hard plastic, is mounted on shock absorbent pad 436, however, in some embodiments, fiber anchor 434 is fabricated using an elastic material such as rubber that provides both mechanical support and flexibility. In other embodiments, an elastic material is utilized for both fiber anchor 434 and shock absorbent pad 436. In one embodiment, fiber 420 is positioned on shock absorbent pad 436 and fiber anchor 434 is pressed down to hold fiber 420 between shock absorbent pad 436 and fiber anchor 434. In other embodiments, a bonding material such as epoxy is used to join the fiber to these elements. Thus, fiber 420 is mechanically supported at a substantially single longitudinal position by fiber anchor 434 in a substantially rigid manner while still providing some mechanical isolation with respect to mechanical mount 410.

In another embodiment, fiber anchor 434 is attached to mechanical mount 410 using fasteners (e.g., screws) that pass through shock absorbent pad 436, preloading shock absorbent pad 436. In another embodiment, fiber 420 can be sandwiched between shock absorbent pads, for example, with one shock absorbent pad positioned on top of the fiber and the other shock absorbent pad positioned below the fiber. In this embodiment, a clamp, for example, a bent metal clamp can be used to press the shock absorbent pads against the metal support (the gray pad in this case).

By anchoring fiber 420 at a single longitudinal region that is spatially separated from grating section 422, grating section 422 is free to expand and contract longitudinally in response to thermal changes. This structure differs from conventional approaches in which the grating section is anchored at both ends or along portions or all of the length of the grating section. If, for example, the grating section were anchored at both ends and the temperature of the thermo-mechanical housing increased, the elements of the thermo-mechanical housing including mechanical mount 410 would expand, stretching the fiber, thereby increasing the grating spacing and changing the reflection profile of the grating.

Cover plate 414 is mounted to base plate 428 to enclose grating section 422 fiber 420 in the groove formed in base plate 428. In some embodiments, a temperature sensor, for example, a thermistor, is embedded in cover plate 414 in order to provide data related to the temperature of grating section 422 of fiber 420. In contrast with approaches that would measure the temperature of elements more remote from grating section 422, for example, the temperature of mechanical mount 410, the close proximity between grating section 422 of fiber 420 and the temperature sensor embedded in cover plate 414 as well as the thermal conduction between these elements enables the temperature measured at the temperature sensor to closely match the actual temperature of grating section 422 of fiber 420. In other embodiments, the temperature sensor is attached to cover plate 414, embedded in or attached to base plate 428, or the like.

Figure 4B:
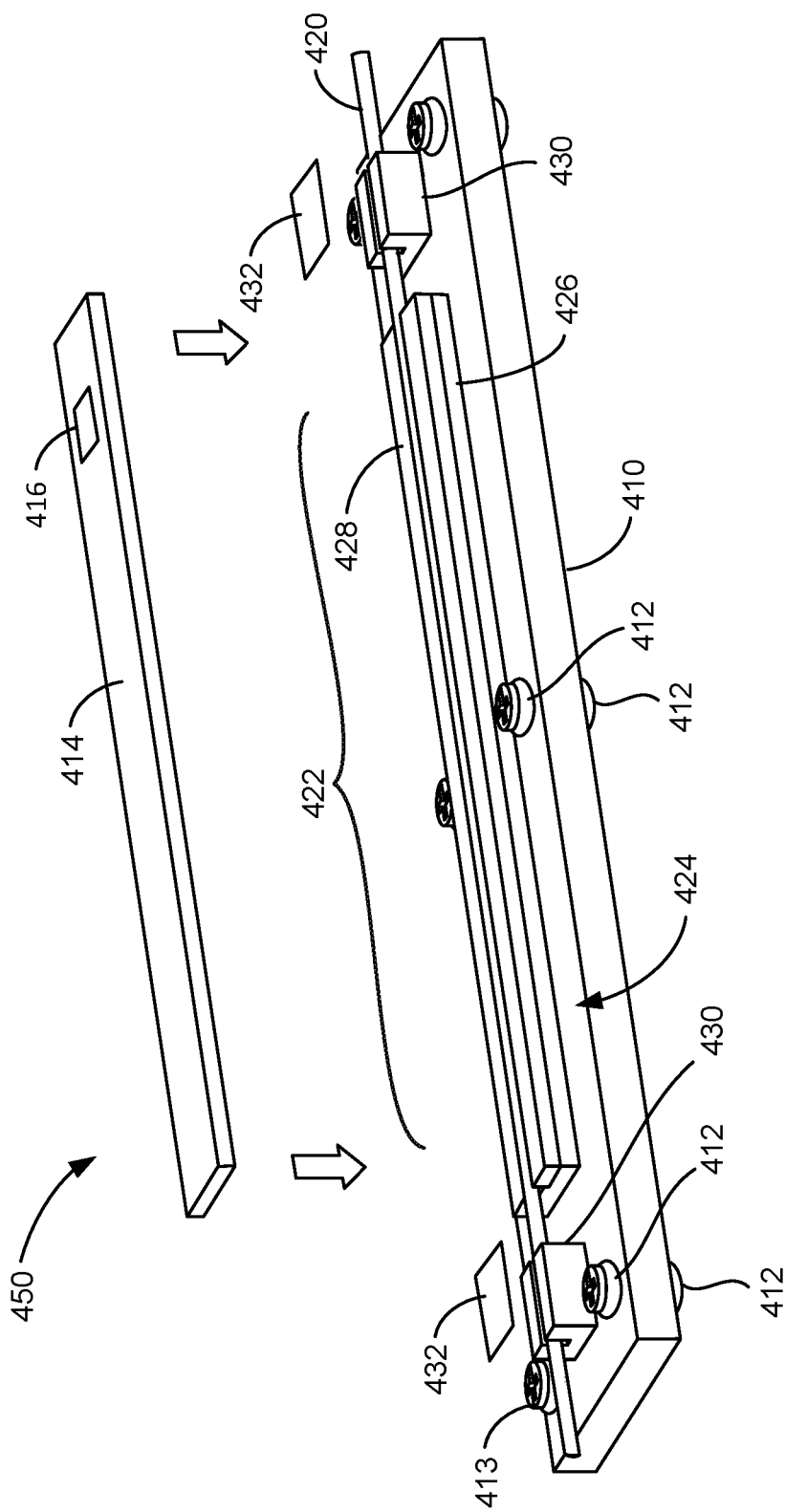
FIG. 4B is a simplified schematic diagram illustrating a thermo-mechanical housing according to an alternative embodiment of the present invention.

FIG. 4B is a simplified schematic diagram illustrating a thermo-mechanical housing according to an alternative embodiment of the present invention. The thermo-mechanical housing illustrated in FIG. 4B shares common components with the thermo-mechanical housing illustrated in FIG. 4A and the description provided in relation to FIG. 4A is application to FIG. 4B as appropriate.

Referring to FIG. 4B, thermo-mechanical housing 450 utilizes components found in thermo-mechanical housing 400, but replaces fiber anchor 434 and shock absorbent pad 436 with fiber guide 430 and cap 432. This, in this embodiment, rather than fiber 420 being anchored at one end, both ends of the fiber are free to translate longitudinally in response to temperature variation and thermal expansion or contraction of the fiber in the longitudinal direction. In this embodiment, cap 432 can be attached to fiber guide 430 in manners other than bonding, including a screw attachment.

In the embodiment illustrated in FIG. 4B, although fiber 420 is free to move in the longitudinal direction, the fiber will remain in the longitudinal groove in base plate 428 for several reasons. For example, fiber position in the base plate will occur due to contact with the thermal material (e.g., thermal paste) placed in the longitudinal groove along with the fiber and/or in the groove running along the length of the fiber guide. Additionally, contact between the fiber and the lubricant compound (not shown) filling the groove will aid in maintaining the fiber in the base plate.

Figure 4C:
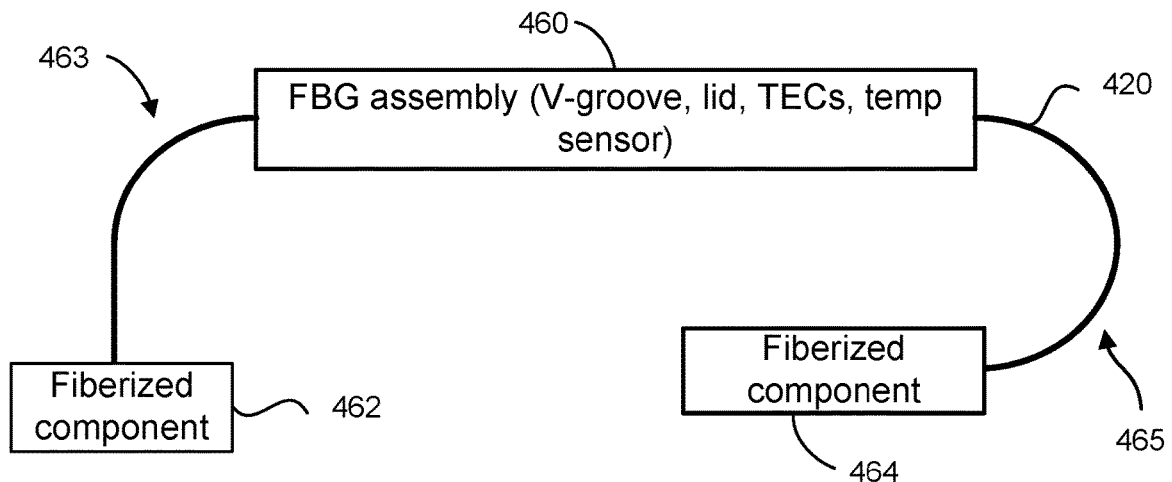
FIG. 4C is a simplified schematic diagram of an FBG assembly incorporated with fiberized components according to an embodiment of the present invention.

FIG. 4C is a simplified schematic diagram of an FBG assembly incorporated with fiberized components according to an embodiment of the present invention. The FBG assembly 460 can be implemented as thermo-mechanical housing 400 illustrated in FIG. 4A or as thermo-mechanical housing 450 illustrated in FIG. 4B. Additionally in some embodiments, only certain components of thermo-mechanical housing 450 are utilized to fabricate FBG assembly 460, for example, elements illustrated in FIG. 4B, including a base plate including a longitudinal groove, a heating element, for example, one or more thermo-electric coolers (TECs), a cover plate with an embedded thermal sensor, other thermal sensors, or the like, but with fiber guide 430 and cap 432 removed at both ends of base plate 428.

Referring to FIG. 4C, fiber 420 extending from thermo-mechanical housing 400/450 is mechanically attached at a first end to a first attachment element, implemented as a fiberized component 462 in this embodiment and at a second end to a second attachment element, implemented as a fiberized component 464 in this embodiment. Fiberized components 462 and 464 assist in maintaining the fiber in the longitudinal groove in the base plate by providing an overall anchor that fixes the portion of the fiber adjacent the fiberized component at a predetermined location. Examples of fiberized components include but are not limited to isolators, couplers, filters, taps, and wavelength division multiplexers.

Additionally, bend 463, illustrated as a 90° bend in this example, and bend 465, illustrated as a 180° in this example, provide flexibility along the length of the fiber, operating in a manner similar to a spring, in order to mitigate temperature-induced length changes or vibrations in the fiber. Although 90° and 180° bends are illustrated in FIG. 4C, this is merely exemplary and other bend angles can be utilized by the embodiments described herein in order to secure the fiber in place via the support provided by the fiberized components and the bends in the fiber.

Figure 4D:
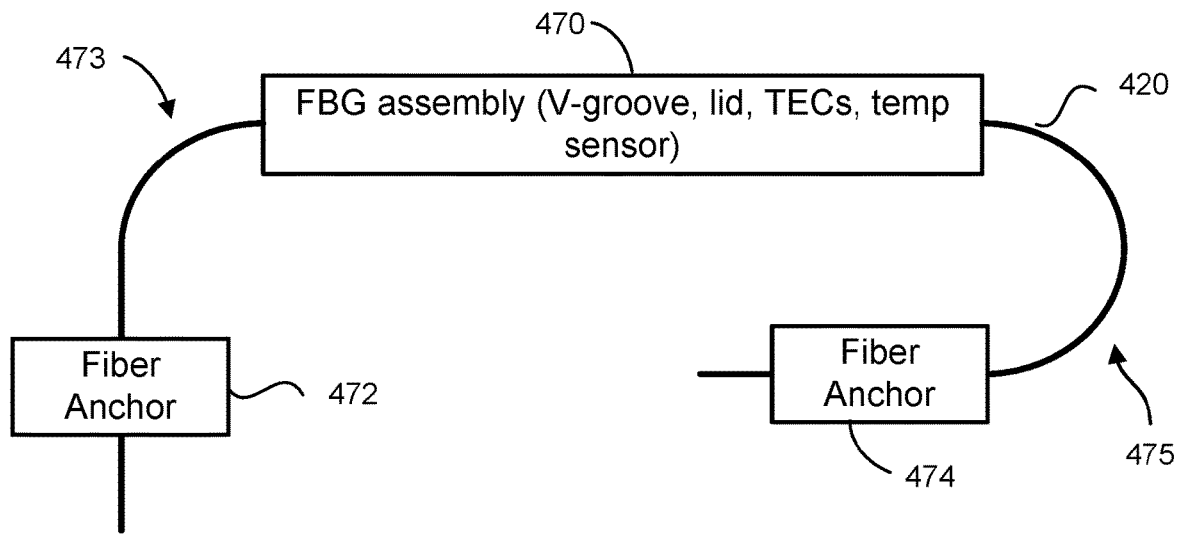
FIG. 4D is a simplified schematic diagram of an FBG assembly incorporated with fixed fiber components according to an embodiment of the present invention.

FIG. 4D is a simplified schematic diagram of an FBG assembly incorporated with fixed fiber components according to an embodiment of the present invention. The FBG assembly 470 can be implemented as thermo-mechanical housing 400 illustrated in FIG. 4A or as thermo-mechanical housing 450 illustrated in FIG. 4B. Additionally in some embodiments, only certain components of thermo-mechanical housing 450 are utilized to fabricate FBG assembly 470, for example, elements illustrated in FIG. 4B, but with fiber guide 430 and cap 432 removed at both ends of base plate 428.

Referring to FIG. 4D, fiber 420 extending from thermo-mechanical housing 400/450 is mechanically attached at a first end to a first attachment element, implemented as a fiber anchor 472 in this embodiment and at a second end to a second attachment element, implemented as a fiber anchor 474 in this embodiment. The fiber anchors can be implemented using fiber anchor 434 illustrated in FIG. 4A. In other embodiments, the fiber anchors can be implemented using suitable adhesives and/or either permanent or temporary bonding materials. Fiber anchors 472 and 474 assist in maintaining the fiber in the longitudinal groove in the base plate by providing an overall anchor that fixes the portion of the fiber adjacent the fiber anchors at a predetermined location.

Additionally, bend 473, illustrated as a 90° bend in this example, and bend 475, illustrated as a 180° in this example, provide flexibility along the length of the fiber, operating in a manner similar to a spring, in order to mitigate temperature-induced length changes or vibrations in the fiber. Although 90° and 180° bends are illustrated in FIG. 4D, this is merely exemplary and other bend angles can be utilized by the embodiments described herein in order to secure the fiber in place via the support provided by the fiber anchors and the bends in the fiber.

Figure 5A:
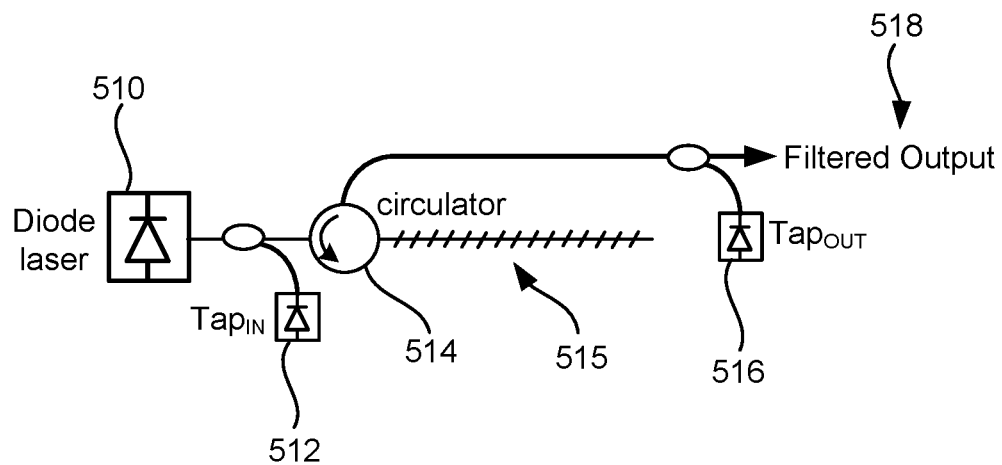
FIG. 5A is simplified schematic diagram of the FBG stabilization architecture for conventional FBGs according to an embodiment of the present invention.
Figure 5B:
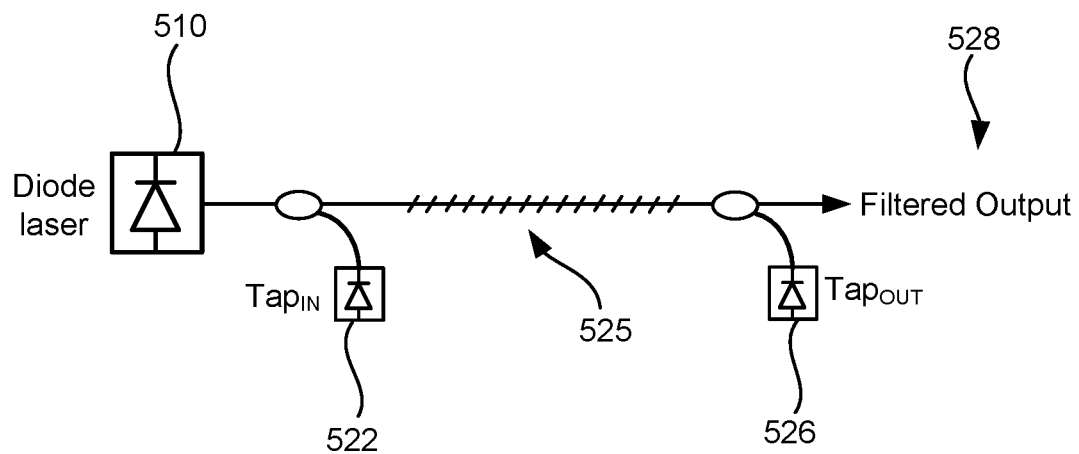
FIG. 5B is a simplified schematic diagram of the FBG stabilization architecture for phase-shifted FBGs according to an embodiment of the present invention.

FIGS. 5A and 5B show two example implementations of using FBGs as an optical filter. A standard FBG has a narrow reflection spectrum. In order to use it as a filter and produce a filtered output 518, an optical circulator 514 is placed between the signal of interest generated, for example, using diode laser 510, and the FBG 515 as illustrated in FIG. 5A. This allows the reflected light to be sent in a different direction than the signal origin. As is commonly known to one skilled in the art, a phase-shifted FBG has a narrow transmission peak within the broader reflection band. In this case, the transmitted light is the filtered light 528, and no optical circulator is necessary to separate the filtered light from the input signal path as illustrated in FIG. 5B. In this filtering application, two optical taps are used to measure optical power. In the conventional FBG case, the input optical tap 512 is located before the signal input to the optical circulator 514 and the output optical tap 516 is located after the reflected output of the optical circulator 514. In the phase-shifted FBG case, the input optical tap 522 is located before the signal input to the FBG 525 and the output optical tap 526 is located after the transmitted output of the FBG 525. The ratio of the power measured at the input and output taps yields a transmission ratio $\theta = I_{TapOUT}/I_{TapIN}$.

Figure 6:
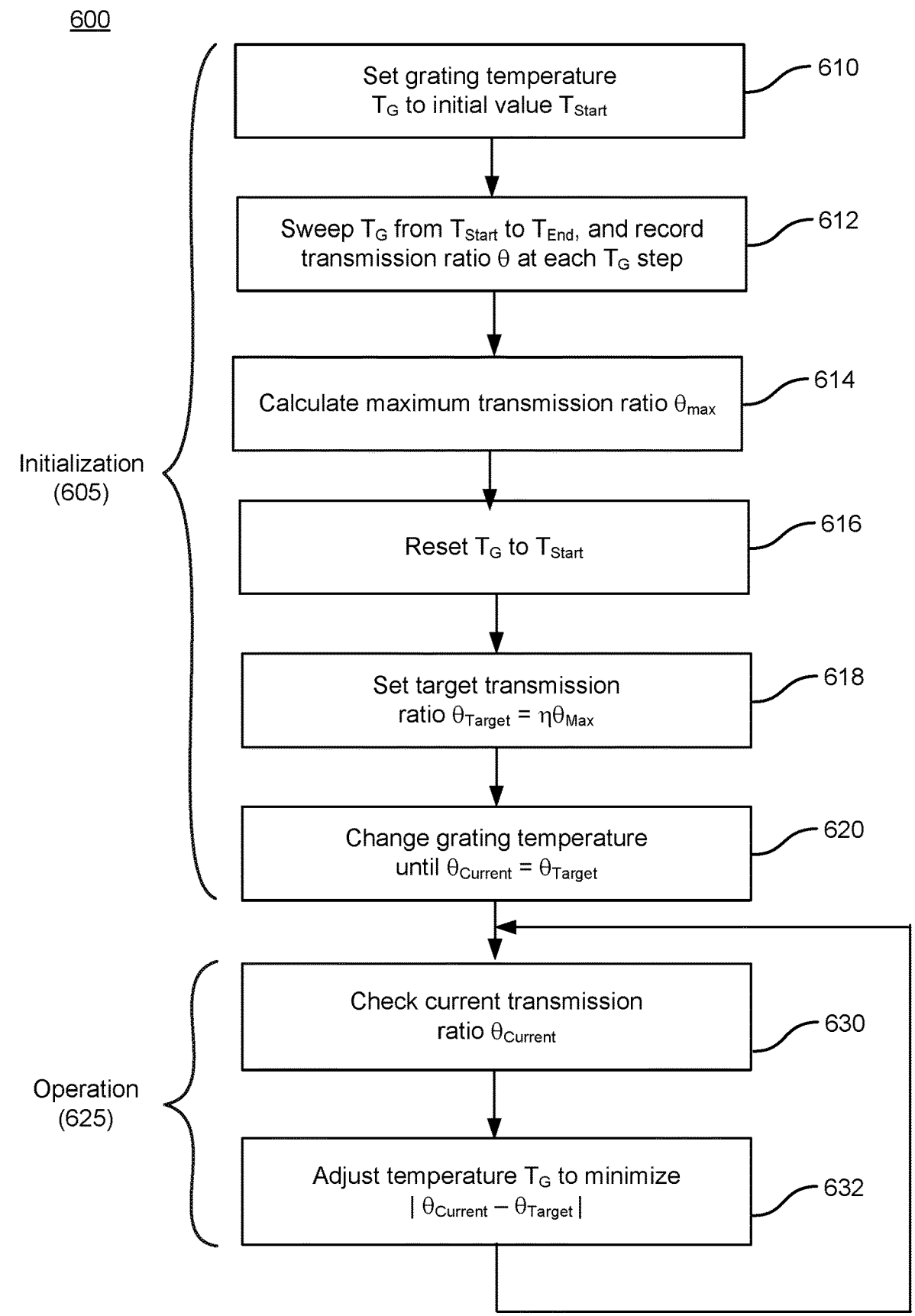
FIG. 6 is a simplified flowchart illustrating a method of initializing and operating a spectrally controlled FBG according to an embodiment of the present invention.

FIG. 6 is a simplified flowchart illustrating a method of initializing and operating a spectrally controlled FBG according to an embodiment of the present invention. The method 600 illustrated in FIG. 6 can be applied to the FBG disposed in the thermomechanical housing illustrated in FIG. 4A. The method 600 illustrated in the flowchart includes two parts or portions: initialization and operation. In both the initialization and operation portions, the grating temperature $T_G$ of the FBG is adjusted and the transmission ratio $\theta$ is measured. Referring to FIG. 6, in the initialization portion 605, which includes steps 610, 612, 614, 616, 618, and 620, the temperature of the grating $T_G$ is set to an initial value $T_{Start}$ (610). Starting from this initial temperature $T_{Start}$, the temperature of the grating $T_G$ is swept over a range from the initial temperature $T_{Start}$ to a final temperature $T_{End}$ (612). At each temperature in the range, the transmission ratio $\theta$ is measured (612). Based on the measured transmission ratios, the maximum transmission ratio $\theta_{Max}$ is calculated (614).

The method also includes resetting the grating temperature $T_G$ to $T_{Start}$ (616) and setting a target transmission ratio $\theta_{Target}$ to a value less than the maximum transmission ratio $\theta_{Max}$. (618). As illustrated in step 618 in FIG. 6, for a multiplier n less than one, $\theta_{Target}$ is set to $\eta\theta_{Max}$. The temperature of the grating $T_G$ is changed, e.g., gradually changed, until the measured transmission ratio $\theta_{Current}$ reaches the target transmission ratio $\theta_{Target}$, i.e., $\theta_{Current}=\theta_{Target}$ (620). It should be noted that by setting the target transmission ratio to a value less than the peak value, any change in the transmission ratio can be corrected for unambiguously. Depending on whether the initial temperature is greater than the temperature $T_G$ corresponding to the maximum transmission ratio or less than the temperature $T_G$ corresponding to the maximum transmission ratio, the temperature changes implemented in step 620 are either an increase in grating temperature or a decrease in grating temperature. In embodiments in which the initial temperature is greater than the temperature $T_G$ corresponding to the maximum transmission ratio, the grating temperature is decreased until $\theta_{Current}=\theta_{Target}$. In embodiments in which the initial temperature is less than the temperature $T_G$ corresponding to the maximum transmission ratio, the grating temperature is increased until $\theta_{Current}=\theta_{Target}$. One of ordinary skill in the art would recognize many variations, modifications, and alternatives.

The operation portion 625 of the method 600 includes continuously or iteratively measuring the current transmission ratio $\theta_{Current}$ (630) and adjusting (632) the grating temperature $T_G$ to maintain the transmission ratio at its target value $\theta_{Current}=\theta_{Target}$. In some embodiments, the temperature controller response is overdamped to minimize over- and under-shoot in the adjustment of the grating temperature $T_G$. If the input power exceeds the input power used in the initialization, the target transmission ratio $\theta_{Target}$ is reduced to prevent feedback/control toggling due to increased optical power within the FBG.

It should be appreciated that the specific steps illustrated in FIG. 6 provide a particular method of stabilizing the FBG according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
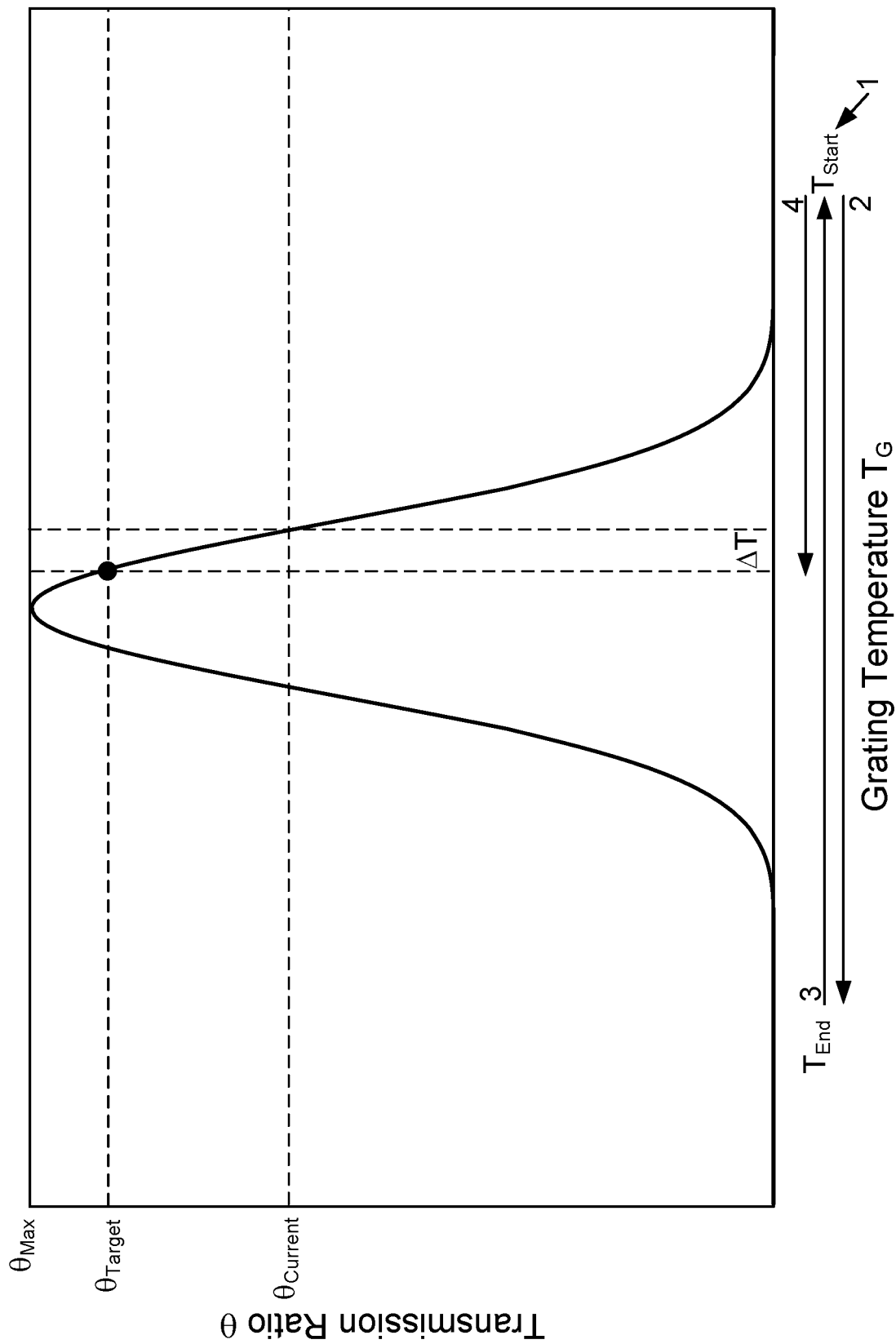
FIG. 7 is a plot illustrating transmission ratio as a function of grating temperature according to an embodiment of the present invention.

FIG. 7 is a plot illustrating transmission ratio as a function of grating temperature according to an embodiment of the present invention. The initialization portion 605 is illustrated below the grating temperature axis. (1) The temperature of the grating $T_G$ is set to an initial value $T_{Start}$. (2) Starting from this initial temperature $T_{Start}$, the temperature of the grating $T_G$ is swept over a range from the initial temperature $T_{Start}$ to a final temperature $T_{End}$. At each temperature in the range, the transmission ratio $\theta$ is measured. Based on the measured transmission ratios, the maximum transmission ratio $\theta_{Max}$ is calculated.

(3) The grating temperature $T_G$ is reset to $T_{Start}$ and (4) and the temperature of the grating $T_G$ is changed so that the measured transmission ratio $\theta_{Current}$ reaches the target transmission ratio $\theta_{Target}$.

As discussed in relation to the operation portion 625, temperature tuning can be implemented by measuring the current transmission ratio $\theta_{Current}$ and adjusting the grating temperature $T_G$ to shift the transmission ratio toward the target value $\theta_{Target}$. In the example shown in in FIG. 7, the current transmission ratio $\theta_{Current}$ is less than target value $\theta_{Target}$. Accordingly, the grating temperature $T_G$ is decreased by $\Delta T$ to shift the transmission ratio toward the target value $\theta_{Target}$. Although in the embodiment illustrated in FIG. 7, the target value $\theta_{Target}$ is approximately 90% of the maximum transmission ratio, this is merely illustrative and is not required by embodiments of the present invention and in other embodiments, the target value $\theta_{Target}$ is either closer to the maximum transmission ratio or farther from the maximum transmission ratio. As an example, in some embodiments, the target value $\theta_{Target}$ can be approximately half the maximum transmission ratio, thereby being position near the maximum of the slope of the transmission ratio to the grating temperature in order to achieve high sensitivity. One of ordinary skill in the art would recognize many variations, modifications, and alternatives.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method of stabilizing a fiber Bragg grating (FBG) disposed in a thermomechanical housing, the method including:
 performing an initialization process including:
  setting a temperature of the FBG to an initial value;
  changing the temperature of the FBG to a final value;
  measuring a transmission ratio at a plurality of FBG temperatures between the initial value and the final value;
  determining a maximum transmission ratio;
  setting the temperature of the FBG to the initial value; and
  setting a target transmission ratio equal to a predetermined fraction of the maximum transmission ratio; and
  changing the temperature of the FBG until the transmission ratio equals the target transmission ratio;
 performing an operation process including:
  (a) measuring the transmission ratio;
  (b) adjusting the FBG temperature to align the measured transmission ratio with the predetermined fraction of the maximum transmission ratio; and
  (c) iteratively performing (a) and (b).

2. The method of claim 1 wherein iteratively changing the temperature of the FBG comprises increasing the temperature of the FBG.

3. The method of claim 1 wherein iteratively changing the temperature of the FBG comprises decreasing the temperature of the FBG.

4. The method of claim 1 wherein the predetermined fraction is between 80% and 95%.

5. The method of claim 1 wherein the initial value is greater than the final value.

6. The method of claim 1 wherein changing the temperature of the FBG comprises iteratively changing the temperature of the FBG and measuring the transmission ratio until the transmission ratio equals the target transmission ratio.

7. The method of claim 1 wherein the target transmission ratio is 90% of the maximum transmission ratio during the initialization process.

8. The method of claim 1 wherein the FBG is configured to spectrally filter light over a range of wavelengths.

9. The method of claim 1 wherein the FBG comprises a cavity mirror configured to reflect light over a range of wavelengths.

10. The method of claim 1 wherein measuring the transmission ratio includes directing reflected light to a measurement device using an optical circulator.

11. The method of claim 1, further comprising utilizing a fiber guide with a longitudinal channel to support a fiber containing the FBG and allowing for longitudinal expansion or contraction of the fiber due to temperature changes.

12. The method of claim 1, further comprising securing the FBG at a single longitudinal position within the thermomechanical housing.

13. The method of claim 1, further comprising applying a lubricant compound to the FBG to enhance thermal conductivity between the FBG and the thermomechanical housing.

14. The method of claim 1 further comprising utilizing a low-friction sheath around the FBG.

15. The method of claim 14 wherein the low-friction sheath comprises a graphite wrap.

16. The method of claim 1 wherein adjusting the FBG temperature is controlled by a feedback loop based on a difference between the measured transmission ratio and the predetermined fraction of the maximum transmission ratio.

17. The method of claim 1 further comprising adjusting the predetermined fraction of the maximum transmission ratio downward during the operation process when an input power to the FBG exceeds an input power level used during the initialization process.

18. The method of claim 1, wherein environmental temperatures vary by +/−5° C.

19. The method of claim 1, further including using a thermal sensor adjacent to the FBG to monitor the temperature during the initialization process and the operation process.

\* \* \* \* \*